United States Patent [19]
Ellis

[11] Patent Number: 5,546,204
[45] Date of Patent: Aug. 13, 1996

[54] TFT MATRIX LIQUID CRYSTAL DEVICE HAVING DATA SOURCE LINES AND DRAIN MEANS OF ETCHED AND DOPED SINGLE CRYSTAL SILICON

[75] Inventor: Roger K. Ellis, Glendale, Ariz.

[73] Assignee: Honeywell Inc., Minneapolis, Minn.

[21] Appl. No.: 249,408

[22] Filed: May 26, 1994

[51] Int. Cl.[6] ............................. G02F 1/136; G02F 1/1343
[52] U.S. Cl. ................................. 359/59; 257/59
[58] Field of Search ............................. 359/59; 257/59, 257/249

[56] References Cited

U.S. PATENT DOCUMENTS

| | | | |
|---|---|---|---|
| 4,740,782 | 4/1988 | Aoki et al. | 359/59 |
| 4,927,777 | 5/1990 | Hsu et al. | 437/44 |
| 5,233,448 | 8/1993 | Wu | 359/59 |
| 5,237,436 | 8/1993 | Kahn et al. | 359/59 |
| 5,245,452 | 9/1993 | Nakamura et al. | 359/59 |
| 5,296,396 | 3/1994 | Bellezza | 437/43 |
| 5,309,393 | 5/1994 | Sakata et al. | 365/189.01 |
| 5,319,480 | 7/1994 | McCartney | 359/59 |
| 5,343,216 | 8/1994 | Katayama et al. | 359/59 |
| 5,349,453 | 9/1994 | Munakata | 359/40 |
| 5,396,261 | 3/1995 | Hastings, III | 345/92 |
| 5,483,082 | 1/1996 | Takizawa et al. | 359/59 |

FOREIGN PATENT DOCUMENTS

| | | |
|---|---|---|
| 63-70832 | 3/1988 | Japan . |
| 4-106532 | 4/1992 | Japan . |

OTHER PUBLICATIONS

"Refractory silicides for integrated circuits", vol. 17, No.4 (Jul./Aug. 1980). S. P. Muraka, p. 775.

Primary Examiner—William L. Sikes
Assistant Examiner—Toan Ton
Attorney, Agent, or Firm—Kenneth J. Johnson; Ronald E. Champion

[57] ABSTRACT

An active matrix array for liquid crystal displays which provides for a large aperture ratio. A layer of single crystal silicon is disposed over a glass substrate and etched and doped to form multiple source and drain regions for an array of thin film transistors (TFTs). Multiple gate buses are laid across the source and drain regions to form the TFTs. The drain regions each electrically contact a transparent electrode used in switching an individual pixel in a liquid crystal display. The TFTs formed do not encroach significantly into the pixel aperture and the conduction lines are constructed at minimal photolithographical requirements.

20 Claims, 16 Drawing Sheets

View Along Gate Bus
View A-A

View Along Gate Bus
View A—A

View Along Line Parallel to Gate
View B—B

View Along Drain—ITO Contact
View C—C

View Along The Source Bus
View D-D

View Along Gate Bus
View A-A

SIDE VIEW

END VIEW 5,546,204

TFT MATRIX LIQUID CRYSTAL DEVICE HAVING DATA SOURCE LINES AND DRAIN MEANS OF ETCHED AND DOPED SINGLE CRYSTAL SILICON

FIELD OF THE INVENTION

The present invention pertains to active matrix liquid crystal displays (AMLCD's), and more particularly, to providing a larger aperture ratio in an AMLCD.

BACKGROUND OF THE INVENTION

LCD technology is being developed as a possible successor to cathode ray (CRT technology for many applications. LCD technology offers important advantages, such as high reliability and reduced power, size and weight. However, in the current state of development, LCD image rendering capabilities fall short of that achievable from the use of CRT's.

There is a great need for high resolution thin film transistor/liquid crystal displays in a wide range of possible applications ranging from portable computers and test equipment to high resolution projection TV's. Such displays typically consist of a large number of picture elements (pixel) arranged in an active matrix. For a display system where the electro-optical medium is liquid crystal, each pixel is defined by a dedicated electrode on one side of two opposite transparent substrates and another electrode, which is common to all pixels and faces the viewer.

FIG. 1 illustrates in circuit form a prior art TFT liquid crystal display device. Each pixel in the active matrix is comprised of a TFT switch and a liquid crystal capacitor. The TFT gate electrodes for all the cells in a row are connected to a common horizontal gate bus, while the TFT sources in all the cells of each column are connected to a vertical data bus. The cells are addressed in a "line-at-a-time" or by line-by-line mode. By pulsing a gate bus to a positive potential relative to the source potential during the addressing interval for a particular row, the TFT's in that row are switched on. At the same time, the data signal voltages on the source busses are transferred to the TFT output electrodes (drains) and the liquid crystal capacitors. When the gate bus is switched off as the next row is addressed, the data signals are stored on the capacitors until the next addressing cycle for a particular row in the succeeding frame.

In the above described display system, the number of row and column conductors needed corresponds to the number of rows n and columns m for n×m pixels. In addition to the need to devote a portion of area of the display device to accommodate the row and column conductors there is also a possibility that, in view of the large number of conductors used, one or more of these conductors may be defective, rendering the display device unusable. This problem is quite common at the crossovers of row and column conductors. Obviously, the more conductors employed the greater this possibility becomes to adversely affect the yield of a large area display device.

Furthermore, the large number of row and column conductors causes problems with the production of small area display devices which are used for projection displays. Large area displays can be obtained from small area TFT liquid crystal displays by using a projection system in which the image produced by the small area display is projected onto a large area screen. However, in order to provide the desired display resolution after projection, the display device generating image should have an adequate number of row and columns of pixel density. If the number of the row and column conductors is large, a large portion of the display area is occupied by the conductors and the aperture ratio (i.e., display area where light can transmit/total area) on the display is small. Then the display exhibits low light levels.

FIG. 2 illustrates configuration of a typical prior art liquid crystal display array. Included in the array are gate bus lines 4 and source bus lines 6 which intersect in a grid-like pattern. Between the bus lines are picture elements which is usually liquid crystal held between two transparent electrodes 2. In one corner of the picture element is the switching element, a thin film transistor (TFT) 5, which either adds or removes the voltage from the liquid crystal thus making the picture element either clear or opaque. The TFT is comprised of the gate electrode 8, the source electrode 7 as well as the drain electrode 9. In this configuration, the connections for the TFT encroaches upon the normally rectangular picture element. Because of the need of hard contacts between the different bus lines, this large of a structure is necessary.

The largest reduction in aperture area for conventional AMLCD layouts is due to the need for the interconnects and contacts. Specifically, the source databus and the gate databus dramatically reduce the pixel aperture. These busses must be made larger than the minimum photolithographical dimension due to the presence of source and drain contacts at each pixel. Also, a major cause of failure of the prior art devices during their operating life is due to the contacts separating.

A further disadvantage of the prior art methods is the processing method used to construct the array. In order to provide properly conductive bus lines, metal must be used to end the array. Metal/indium tin oxide (ITO) contamination is a major source of yield loss. Also, the design of the prior art is complicated by the need for multiple layers of metal.

The present invention offers the advantages of providing a larger aperture ratio and greatly simplifying the design and fabrication of active matrix liquid crystal displays.

SUMMARY OF THE INVENTION

The invention described herein is an active matrix which provides a large aperture ratio in a liquid crystal display. The liquid crystal display is comprised of a lower substrate with multiple parallel source lines disposed thereon.- Also disposed on the lower substrate are drain means for a thin film transistor (TFT). An insulating layer is disposed over both the data line and the drain means. Multiple gate lines are disposed over the insulating layer so as to intersect the data lines and drain means. The intersection of these three elements forms an array of TFTs, proximate to each of TFTs is a transparent electrode which is incorporated into the picture elements for the liquid crystal display. The drain means of each TFT contacts the transparent electrode to provide individual switching of the picture elements within the LCD.

The large aperture ratio for the AMLCD is possible for a variety of reasons. First, the source and gate lines for the switching elements in the array can be constructed using minimum photolithographical dimensions. Also, the gate and source can be constructed of transparent conductive material thus improving the light transmission. Also, the removal of the metal contacts eliminates the encroachment of the switching element into the picture element, thus increasing its aperture ratio. The reduction of contacts in the

DESCRIPTION OF THE PREFERRED EMBODIMENTS

Figure 3A:
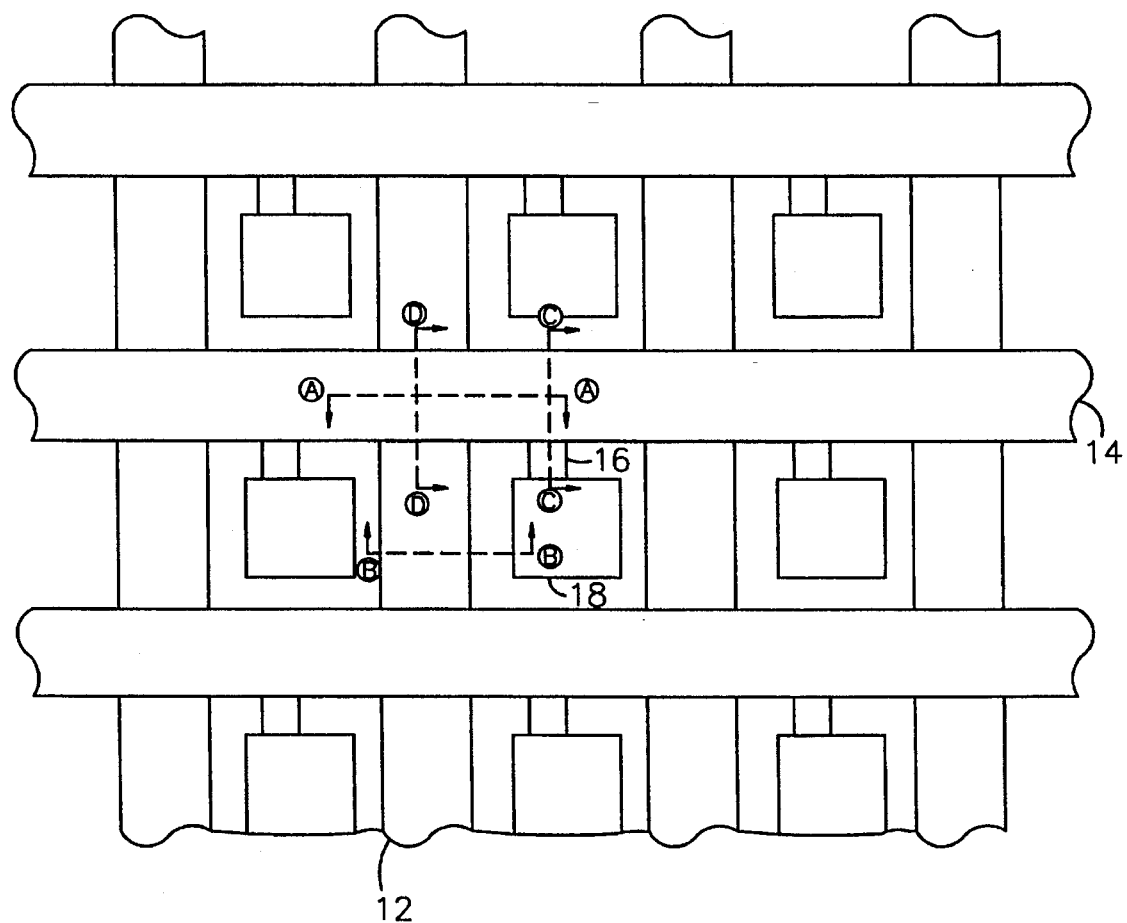
FIG. 3a is a top view of a contactless array.

FIG. 3a discloses a partial top view for a contactless array architecture for a large aperture ratio active matrix liquid crystal display (AMLCD). The array in the first embodiment of the invention is comprised of source buses 12 which run vertically and are in electrical contact with display drivers (not shown) that provide the image signals. The source buses 12 intersect gate buses 14 which run horizontally. The gate buses are also in electrical contact with the display drivers (not shown). Interspaced between the intersections of the gate and source buses are the transparent electrodes 18 for each pixel in the liquid crystal display. The pixel electrodes 18 are in electrical contact with drain regions 16. All the elements shown in FIG. 3a are disposed on a common substrate. The intersection of the source bus, drain region, and gate bus form a thin film transistor (TFT) which is the switching element for the pixels in the display. A better understanding of the construction of the TFT can be understood by study of FIGS. 4 and 3b–3e.

Figure 4:
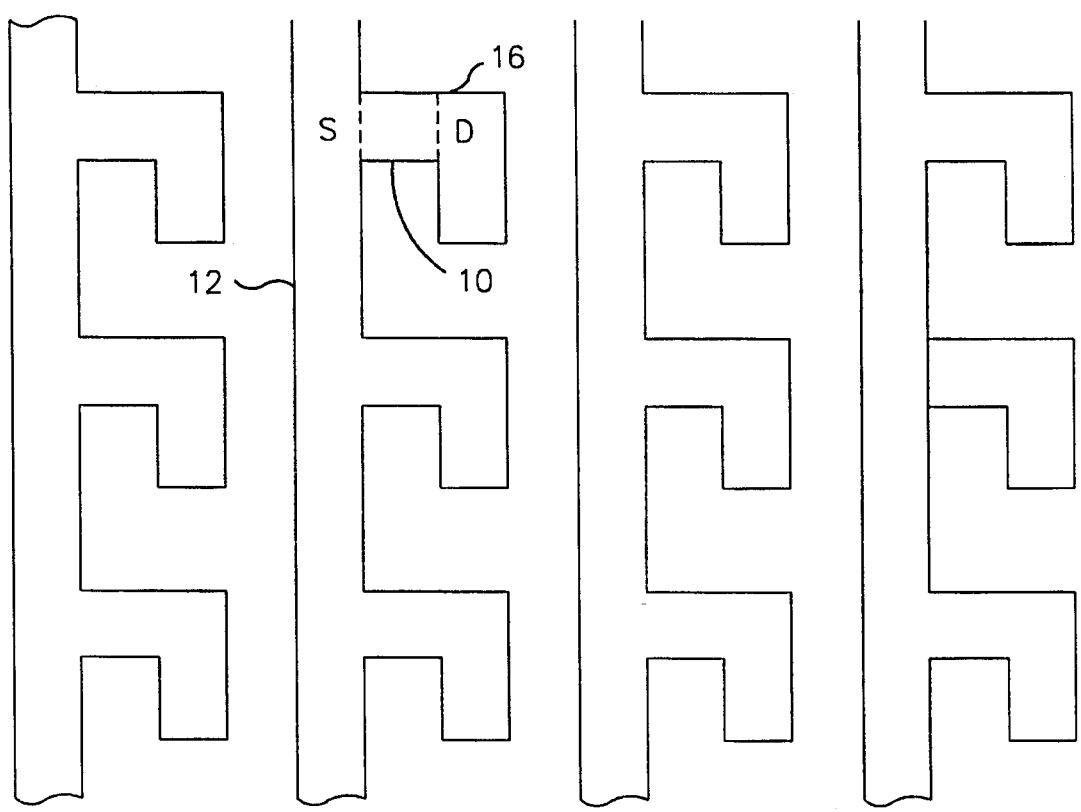
FIG. 4 is a top view of the source and drain regions in the single crystal silicon layer for the contactless array.

FIG. 4 is a view of just the source bus and drains deposited on a clear glass substrate which serves as the base layer for the entire active matrix. The source buses 12 are defined in a buried layer of single crystal silicon 10 that has been heavily doped n+ to reduce line resistance. The region defined by the drain 16 has also been heavily doped n+. The region between the source 12 and the drain 16 which is part of the silicon layer 10 is left undoped. The source buses and drains may also be constructed of a strip of refractory metal silicide such as titanium, or Tungsten, laid on top of a layer of polysilicon. This can be done in the cases where a lower resistance is required. Further, the gate buses and drains may also be constructed of transferred silicon through a technology provided by the Kopin Corporation. Referring again to FIG. 3a the gate buses are then laid over the source buses and the transparent electrodes are interspaced between the intersection of the buses. The gate bus in the preferred embodiment is constructed from indium tin oxide (ITO) which is transparent and conductive. This material has the proper conductivity to carry the gate signal. Other possibilities for gate bus materials are polysilicon or a refractory metal silicide like titanium as Tungsten. The gate and drain buses may also include a layer of refractory metal silicide such as titanium, which could be laid on the top of the silicon. This can be done in the cases where a lower resistance is required.

Figure 3B:
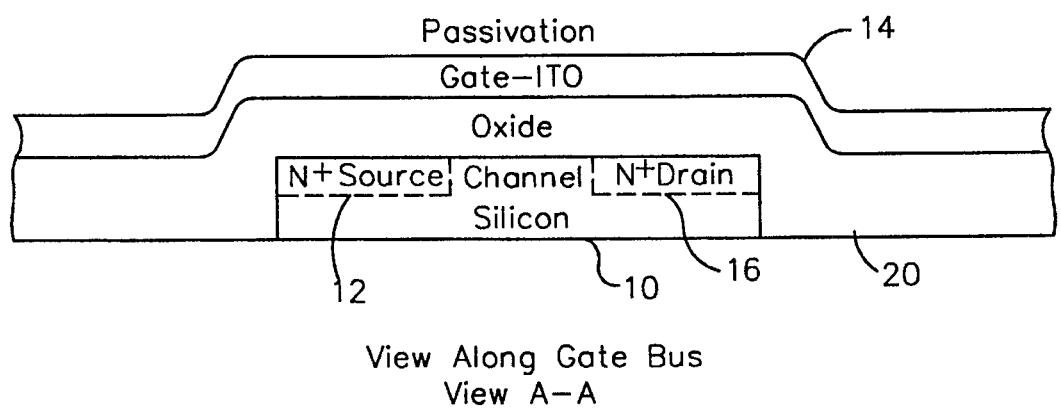
FIG. 3b is a view of the contactless array along the gate bus.
Figure 3C:
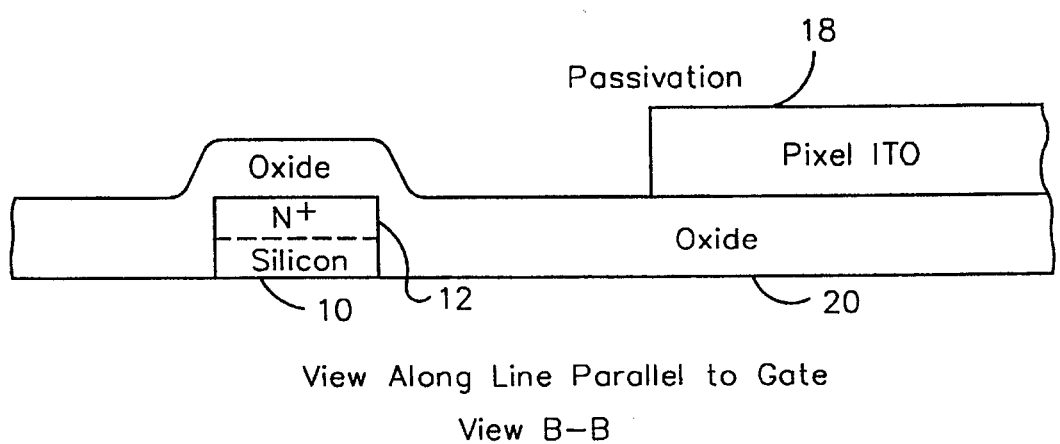
FIG. 3c is a view of the contactless array parallel to the gate bus.

From the cross section along the gate bus shown in FIG. 3b, the construction of the TFT is apparent. After the silicon layer which defines the source bus and the drain bus is laid, a layer of oxide is then deposited over these components. The gate bus is then deposited on the oxide layer so as to intersect the source bus. The source region 12 of the silicon layer 10 is proximate to the drain portion 16, and current through the transistor is controlled by the signal traveling over the gate bus 14. The cross section shown in FIG. 3c which is a cut through the transparent electrode shows the proximity of the pixel electrode 18 to the source bus 12.

Figure 3D:
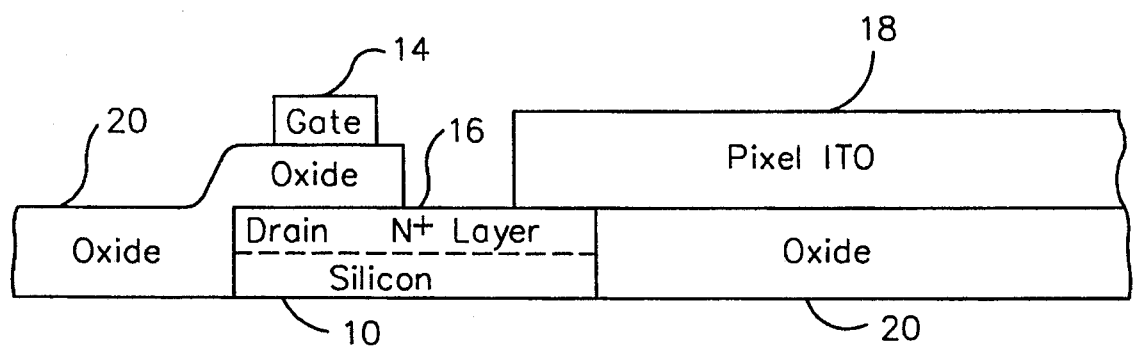
FIG. 3d is a view of the contactless array along the drain.
Figure 3E:
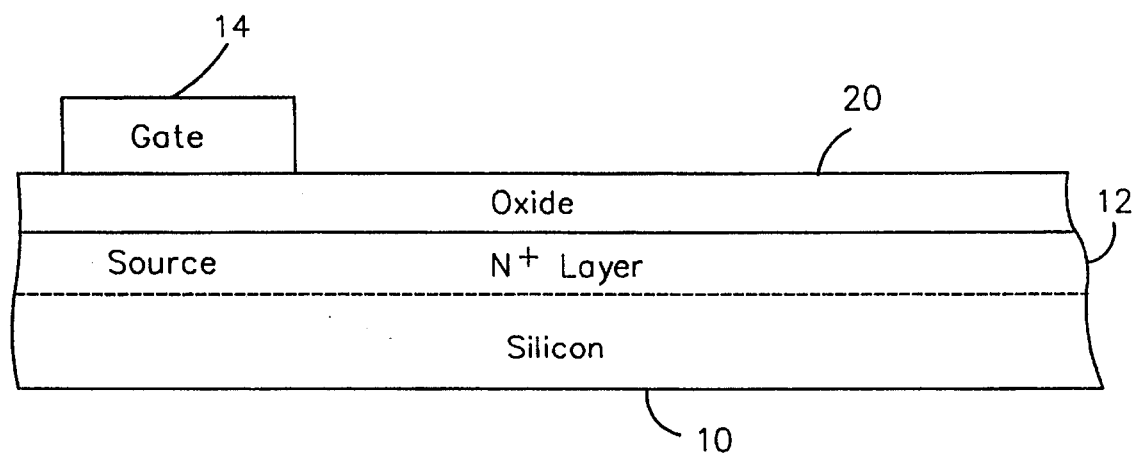
FIG. 3e is a view of the gate bus along the source bus.

The cross section shown in FIG. 3d is taken in a direction parallel to the drain 16. Shown in particular is the electrical contact between the drain and the pixel electrode 18 as well as the proximity of the drain to the gate bus. The nature of the connection between the drain and the pixel electrode is clearly evident. This contact is made through well known semiconductor fabrication techniques rather than a metal contact. The cross section shown in FIG. 3e is along the source bus. Shown in particular is the relationship between the source bus and the gate bus.

Figure 1:
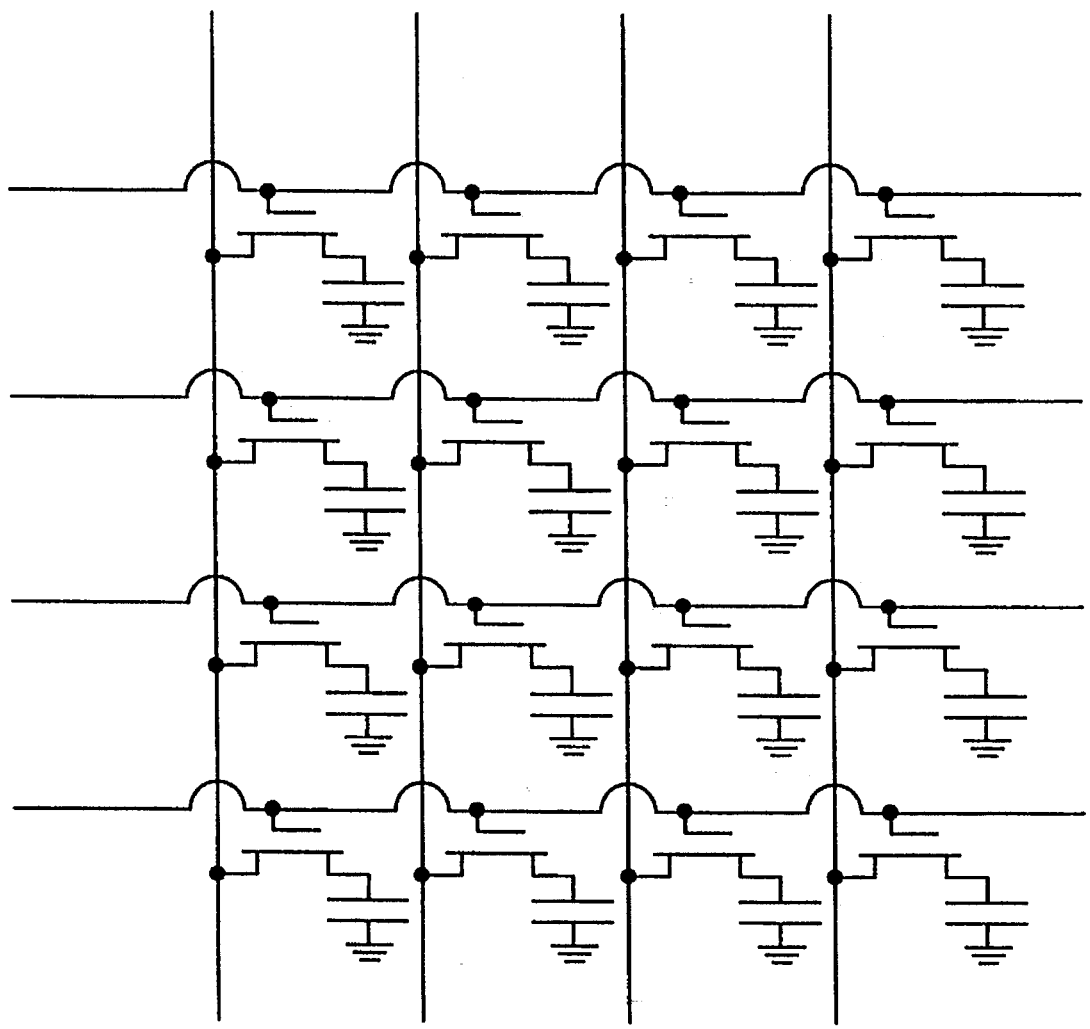
FIG. 1 shows a circuit diagram for a prior art AMLCD device.
Figure 2:
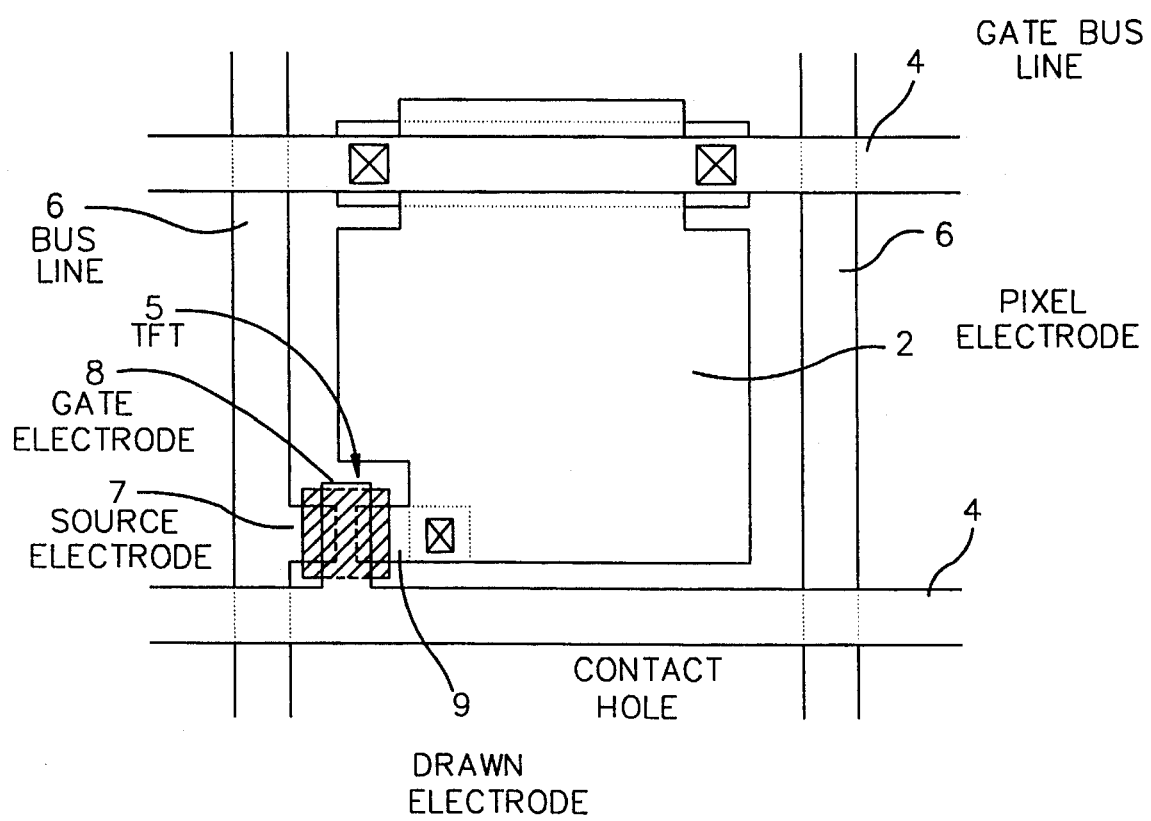
FIG. 2 is a pixel configuration for a prior art AMLCD device.

The elements in FIG. 3a combine to form the active matrix for a liquid crystal display. Image signals are transmitted along the gate and source buses so as to selectively provide a charge at the pixel electrodes. As will be described in more detail below, the absence or presence of a charge at the pixel electrode controls whether that pixel is either on or off. As is well known in the art, the turning on or off of that pixel is in response to the switching of a transistor which is proximate to the pixel. In prior art AMLCD's, these transistors require metal contacts between the source bus line and the transistor as well as a metal contact between the drain of the transistor and the drain electrode. These metal contacts are a weak link in the LCD because it is well known in CMOS technology that one of the first thing to fail in these transistors is the metal contacts. The matrix shown in FIG. 3a has no metal contacts connecting the bus lines to the transistor and the transistor to the drain electrode. Further, the use of transistors with metal contacts requires that the transistor be located in a corner of the pixel aperture. The encroachment of the transistor into the aperture can be clearly seen in the prior art matrix shown in FIG. 2. In the present invention, the construction of the transistor is incorporated into the construction of the bus lines, thus maximizing the pixel aperture.

Figure 5:
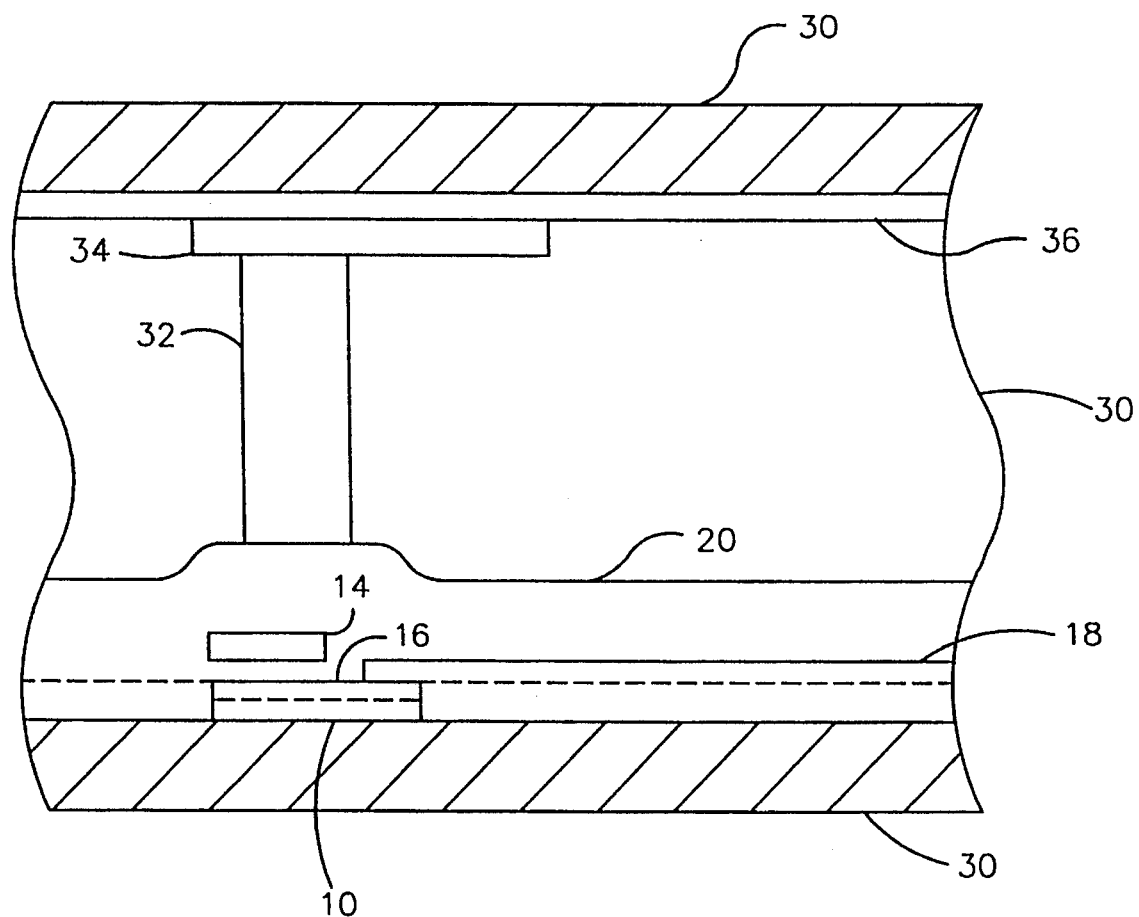
FIG. 5 is a cross sectional view of a pixel in the large aperture ration AMLCD.

The incorporation of the matrix shown in FIG. 3a into a liquid crystal display picture element is shown in FIG. 5. FIG. 5 is a cross section all view of the active portion of a liquid crystal display through the middle of a single pixel.

Included in the active portion of the display are the glass substrates 30 which enclose the elements described above. Laid over the lower substrate 30 is a layer of single crystal silicon 10. This silicon layer is masked off in a pattern as shown in FIG. 4 and the unmasked portion is oxidized and the nitride is removed. With the source and drain regions defined, these areas are heavily doped through phosphorous implant. A gate oxide layer is then laid over the source and drain regions and a gate made of ITO or polysilicon is deposited over this gate oxide. The gate material is then implanted with boron and the source lines are counter doped. The transparent electrode ITO is then laid over the oxide so as to be located between the intersections of the gate and bus lines and to be in electrical contact with the drain region. As seen again in FIG. 5, a layer of oxide is then deposited over the gate line as well as the pixel ITO. In order to define the pixel a spacer post 32 is deposited over the gate line and source lines. A nichrome block 34 is positioned between the spacer post and the common electrode 36 Which is also made of ITO. This common electrode has been deposited previously upon the upper glass substrate 30. As in all liquid crystal displays, liquid crystal fills the gap between the lower electrode 18 and the upper electrode 36.

As is known in the art, the largest reduction in the aperture area of conventional AMLCD layouts is due to interconnects and contacts. Specifically, the source and gate bus lines dramatically reduced the pixel aperture. These buses must be made larger than the minimum photolithographical dimension due to the presence of source and drain contacts at each pixel. In the embodiment described above, contacts are eliminated in the array. This results in a significantly greater aperture ratio than is available with most conventional architectures.

The embodiment described above also has certain processing advantages. One in particular is elimination of all metal in the array. Metal/ITO contamination is a major source of yield loss. Additionally, there is no longer any need for two layers of metal in the fabrication process. This greatly simplifies the design and fabrication of AMLCD's.

The unique TFT configuration disclosed above necessitates a mode of operation for the active matrix which is different from what is known in the art. The operation will be described in terms of a single pixel receiving signals over a gate and a source bus lines. As is well known in liquid crystal technology, a charge across liquid crystal in a pixel controls whether the pixel is turned on or off. Under the biasing scheme for the TFTs of the embodiments of the invention described herein, the pixel is turned on by first setting the source data line voltage to −5 volts and the gate line voltage to +5 volts. With the transistor turned on, current flows from the source to the drain and as the drain voltage gets more negative, the potential between the source and the drain goes to zero. At a differential voltage of zero volts, the process stops. In order to discharge or turn off the pixel, the source line voltage is set to +5 volts and the gate line voltage is set to +5 volts. With the transistor turned on again the current flows from the drain to the source of the transistor. As the drain voltage gets more positive, the difference between the source voltage and the gate voltage reduces to zero. When this occurs, the transistor turns off and the current no longer flows.

This type of operation is different from the prior art since two different physical mechanisms are used to control the amount of charge moved to or from a particular pixel. Both of these voltages are controlled, resulting in superior performance of the pixel. To inhibit modification of surrounding pixels during switching of a particular pixel the gate source bus or data lines of the surrounding pixels are set to tristate. The bias on the surrounding pixel transistors adjust to limit current flow to leakage current only, thus not affecting the status of the surrounding pixels. This type of transistor performance is superior because it better guarantees uniform charge movement during both phases of AMLCD operation, it is easier to manufacture since only two masking layers are required, and the removal of contacts increases the transistor reliability.

Figure 6A:
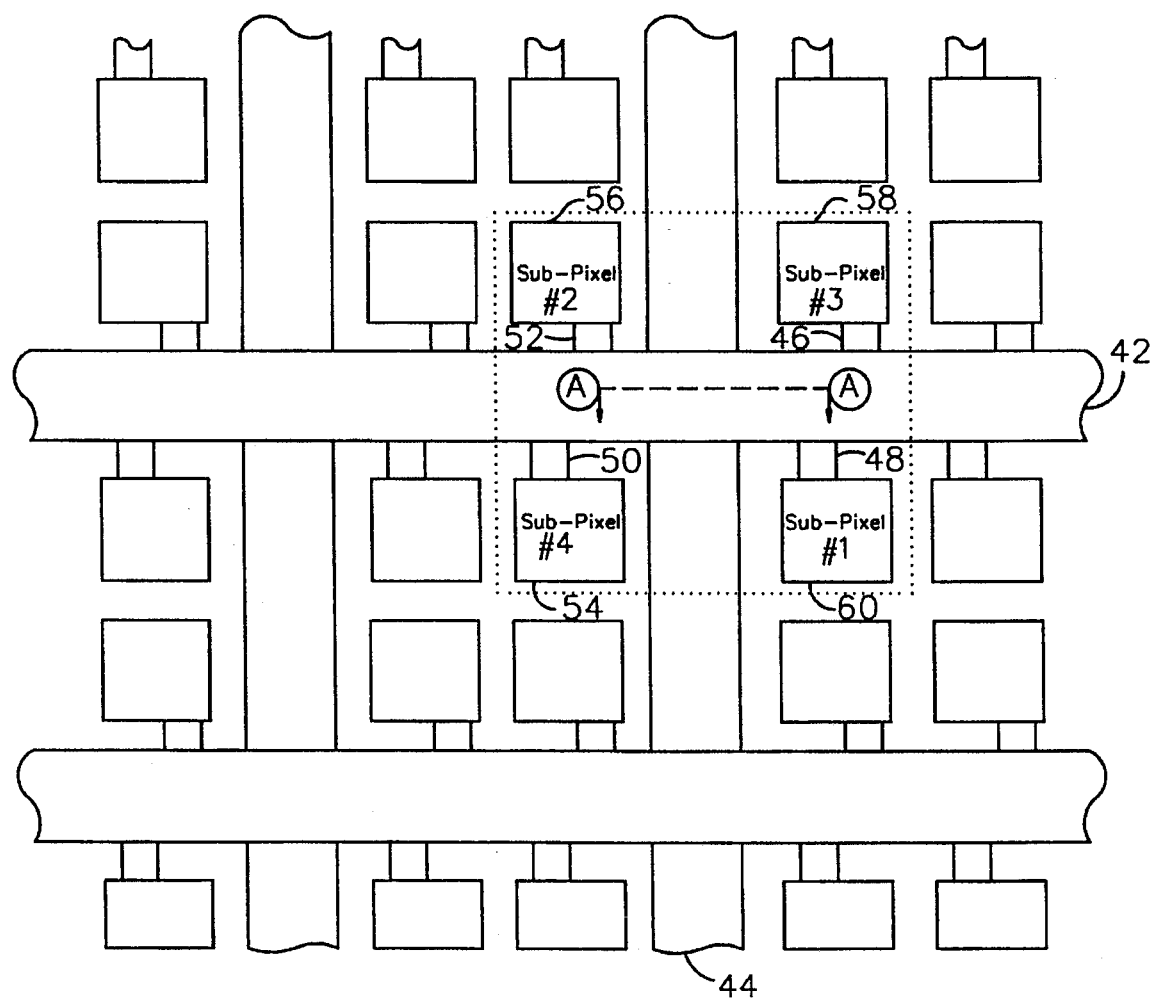
FIG. 6a is a top view of the contactless array in the half tone configuration.
Figure 7:
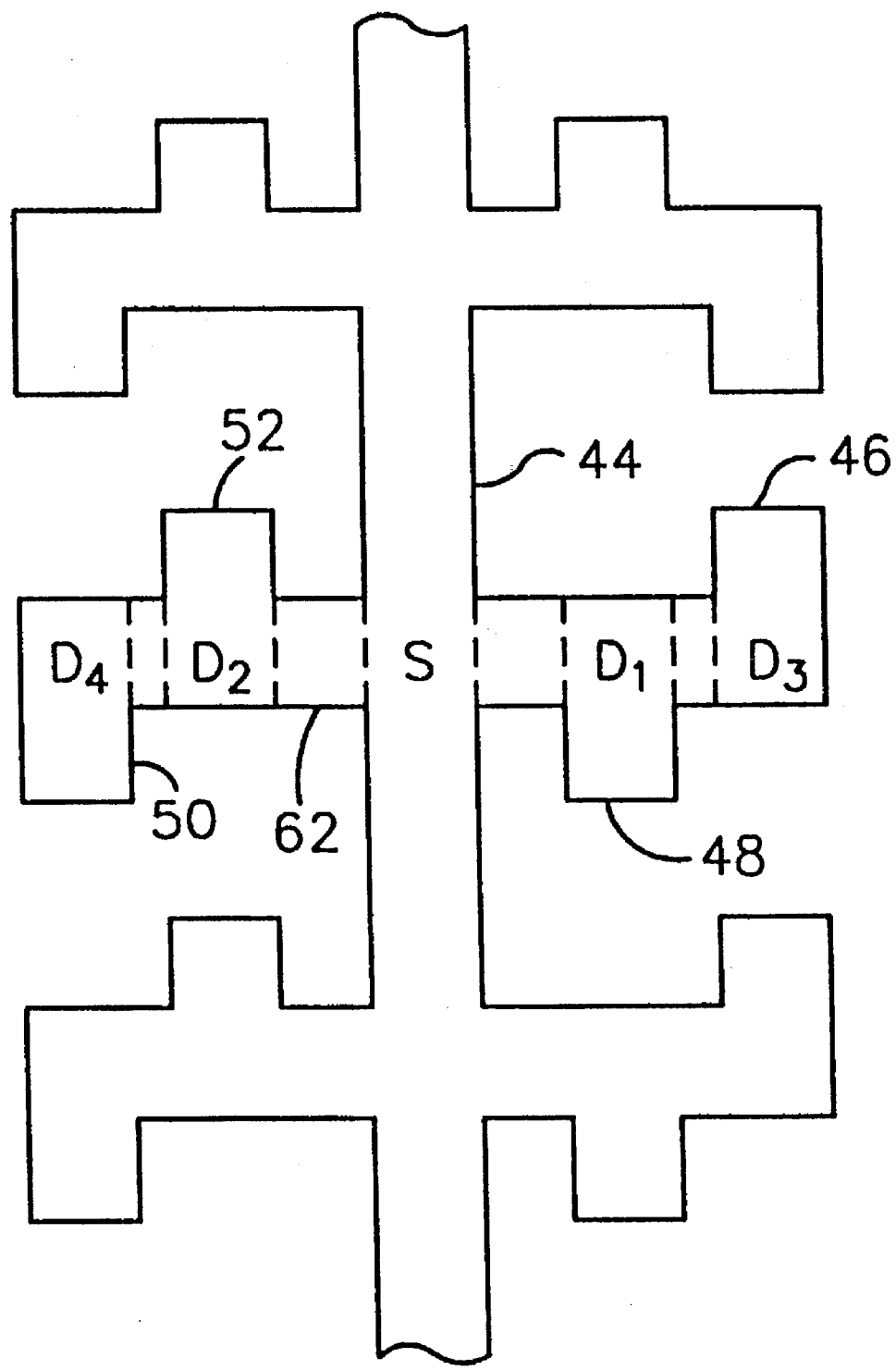
FIG. 7 is a top view of the source and drain regions in the single crystal silicon layer for the halftone contactless array.

The contactless array described above can be modified to provide gray scale in AMLCD's. A halftone configuration for the first embodiment of the active matrix is shown in FIG. 6a. In this configuration half tones are accomplished by breaking up a large pixel into smaller subpixels. In the embodiment shown, the transparent electrode for a particular pixel is broken up into four electrodes, 54, 52, 58 and 60. Each electrode has a drain electrode 50, 52, 46 and 48 respectively. As with the above described configuration, source bus lines 44, intersect gate bus 42. The construction of this matrix is substantially similar to that described above. However, in building this configuration, the masking of the single crystal silicon layer 44 is more intricate. As shown in FIG. 7, four different electrodes 46, 48 and 50 run off a single source line 44. The source and the drains are heavily doped to provide the proper conductivity. Undoped regions of the silicon layer 62 are left between the drain electrodes and the source.

Figure 6B:
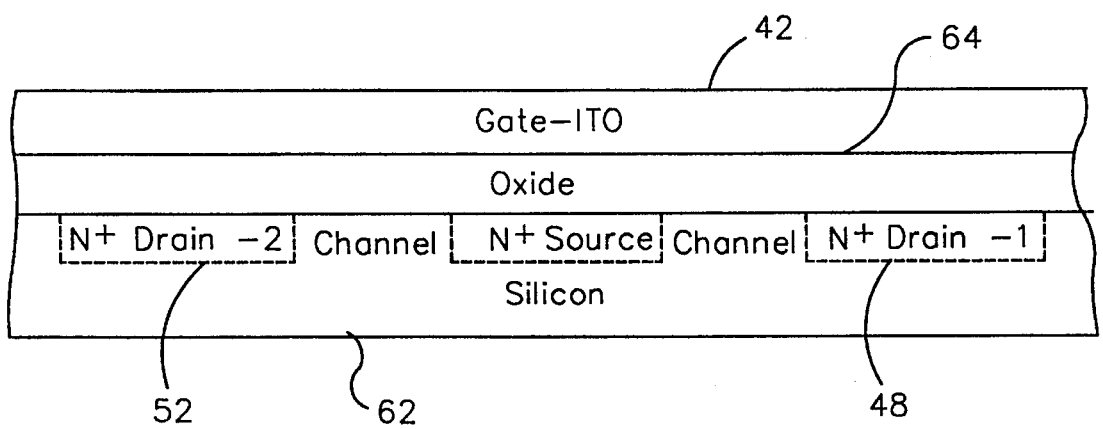
FIG. 6b is a cross sectional view of the half tone version of the contactless array along the gate bus.

The relative locations of the drain electrodes, the source and gate bus lines are shown in FIG. 6b which is a cross section taken parallel to the gate line. The gate bus is laid over the source and drain regions with a gate oxide layer in between. The view in FIG. 6b can be extended out to include drains 46 and 50. In the halftone configuration each sub pixel has its own transistor to control current flow to the subelectrode. The configuration of the drain contact and the subelectrode ITO is identical to that as described in the contactless architecture above.

The relative area of each subelectrode determines its final switching voltage. In the present embodiment the pixel voltage is controlled by the width to length ratio of the active switching element. This ratio is known as the shape factor of the transistor. By changing this length to width ratio, the current which the transistor supplies is changed. In the present invention this is done so that the picture elements which incorporate subelectrodes 56 and 60 turn on at a particular source voltage and the picture elements which incorporate subelectrodes 54 and 58 turn on at a higher voltage. The source and gate voltages are varied in order to provide the desired half tone for a particular pixel. This second embodiment is advantageous in that it allows for the use of half tones in an AMLCD while still achieving maximum pixel aperture ratio which is a benefit of the contactless architecture.

In a third embodiment of the invention, a shared source contact architecture is disclosed for a large area AMLCD's. In some AMLCD architectures, it may be necessary to maximize the aperture ratio for each pixel while also reducing the source bus line resistance. A solution for this problem is to provide a series of evenly spaced contacts along the source buses to provide current to the individual pixel transistors. This configuration offers significant advantages over the prior art which has electrical contacts at each pixel transistor.

Figure 8A:
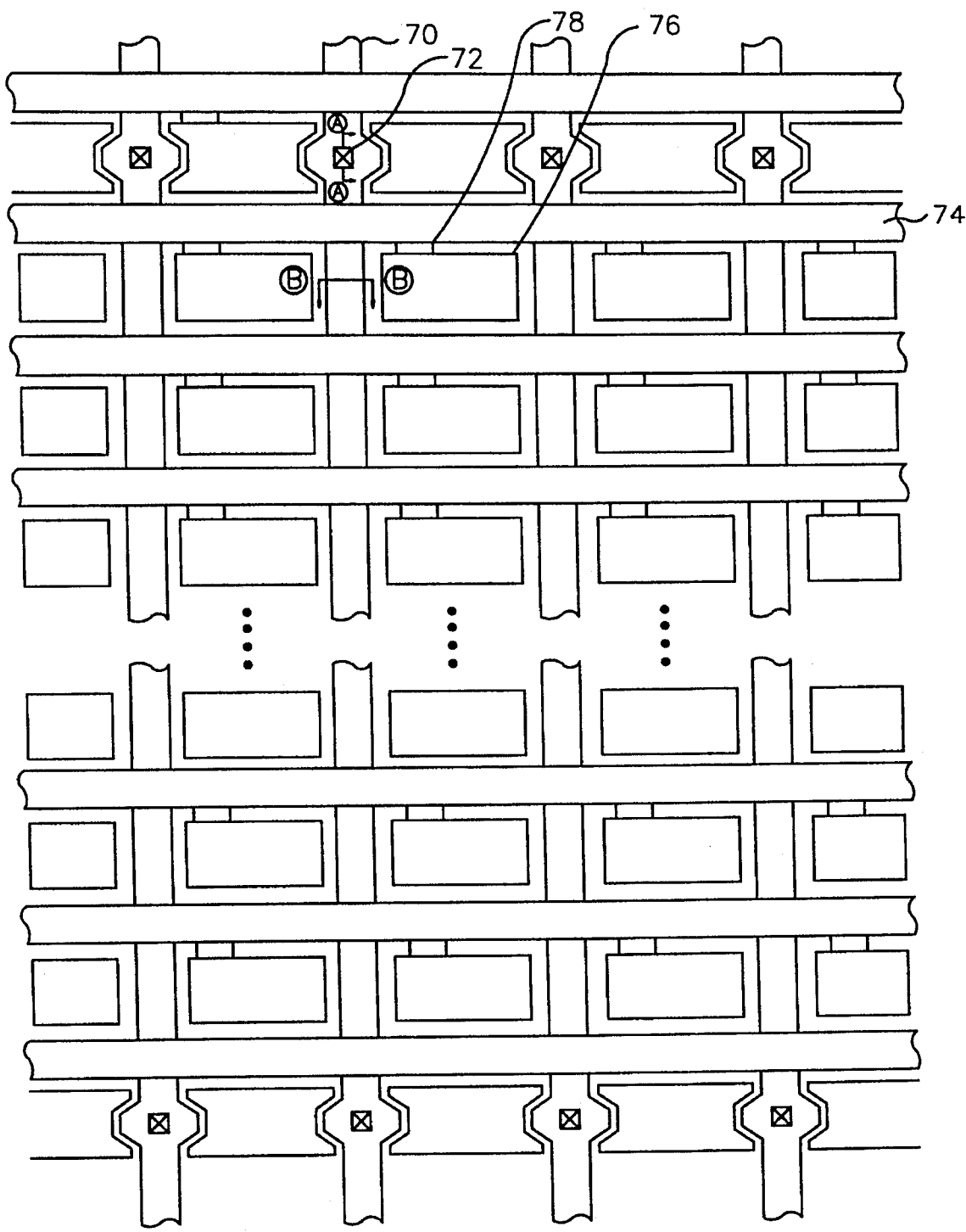
FIG. 8a is a top view of the shared contact array.

The top view for the third embodiment of the active matrix architecture is shown in FIG. 8a. Included in this matrix is source bus 70 assembly, which is intersected by gate bus 74. Proximate to the intersection of the source and gate lines are pixel electrodes 76 which are in electrical contact with the drain electrode 78. The main difference between this embodiment of the invention and the first embodiment described above, are the electrical contacts 72 which are evenly spaced along the source bus. As mentioned above, the contacts are placed at regular intervals along the source line in order to reduce the source line resistance. The number of gate lines between source contacts is typically on the order of 32. The actual number depends on the capacitive time constant during charging of the source bus lines during the AMLCD operation.

Figure 8B:
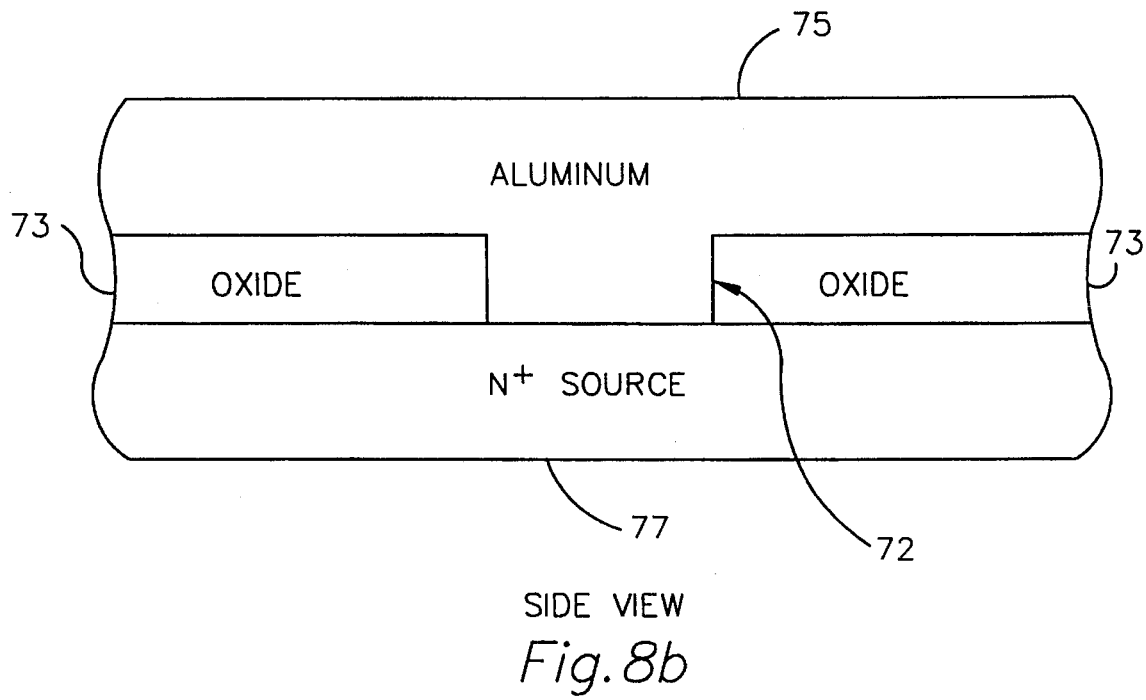
FIG. 8b is a cross sectional view of a shared contact.
Figure 8C:
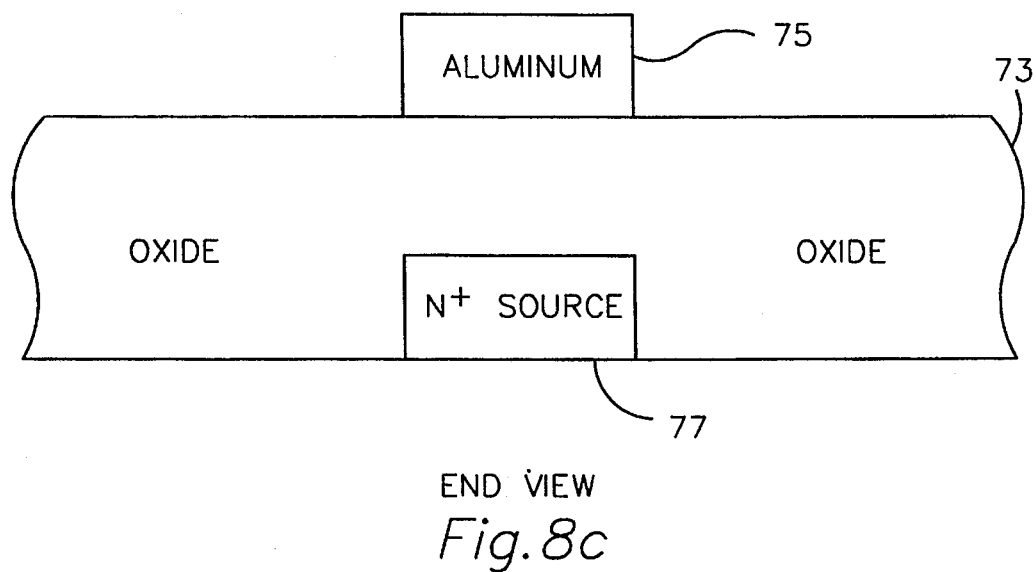
FIG. 8c is a cross sectional view of the source bus.
Figure 9:
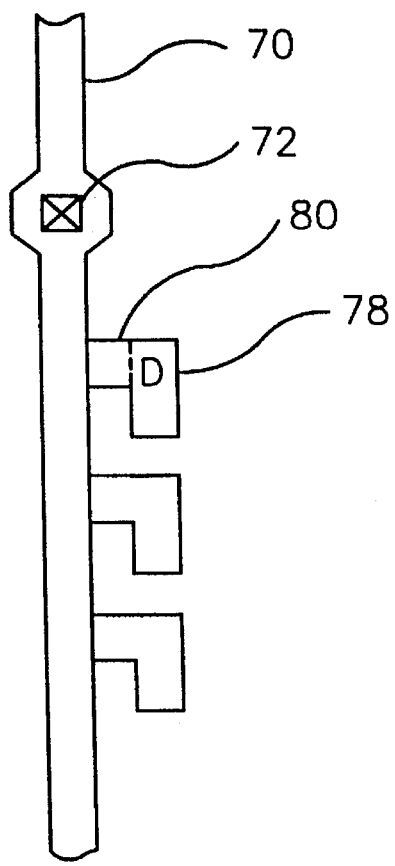
FIG. 9 is a top view of the source and drain regions in the single crystal silicon layer for the shared source array.
Figure 9:
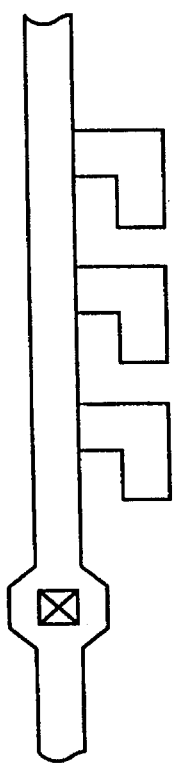

FIG. 9 is a top view of the single crystal silicon layer 80 which through masking and doping has been modified to include source bus assembly 70 as well as drain electrode 78. Also included are electrical contacts 72 which are evenly spaced along the source line. As seen in FIG. 8b, these electrical contacts 72 provide an electrical connection between an aluminum strip 75 of the source bus assembly 70 which runs from the LCD driver (not shown) over the single crystal silicon layer 77. An insulating layer is provided between the silicon layer and the aluminum strip. The relationship between the aluminum strip 75 and the single crystal silicon layer 77 can be seen clearly in FIG. 8c. The transistor configuration for this embodiment is identical to that shown in the first embodiment described above. The only difference between the third embodiment and the first embodiment is the inclusion of the contact 72 along the source line. The contacts 72 only encroach on the pixel aperture at a preset interval while allowing the maximum aperture ratio for the remaining pixels. This provides the maximum aperture ratio for a given photolithographic resolution while maintaining superior dynamic performance.

Figure 10:
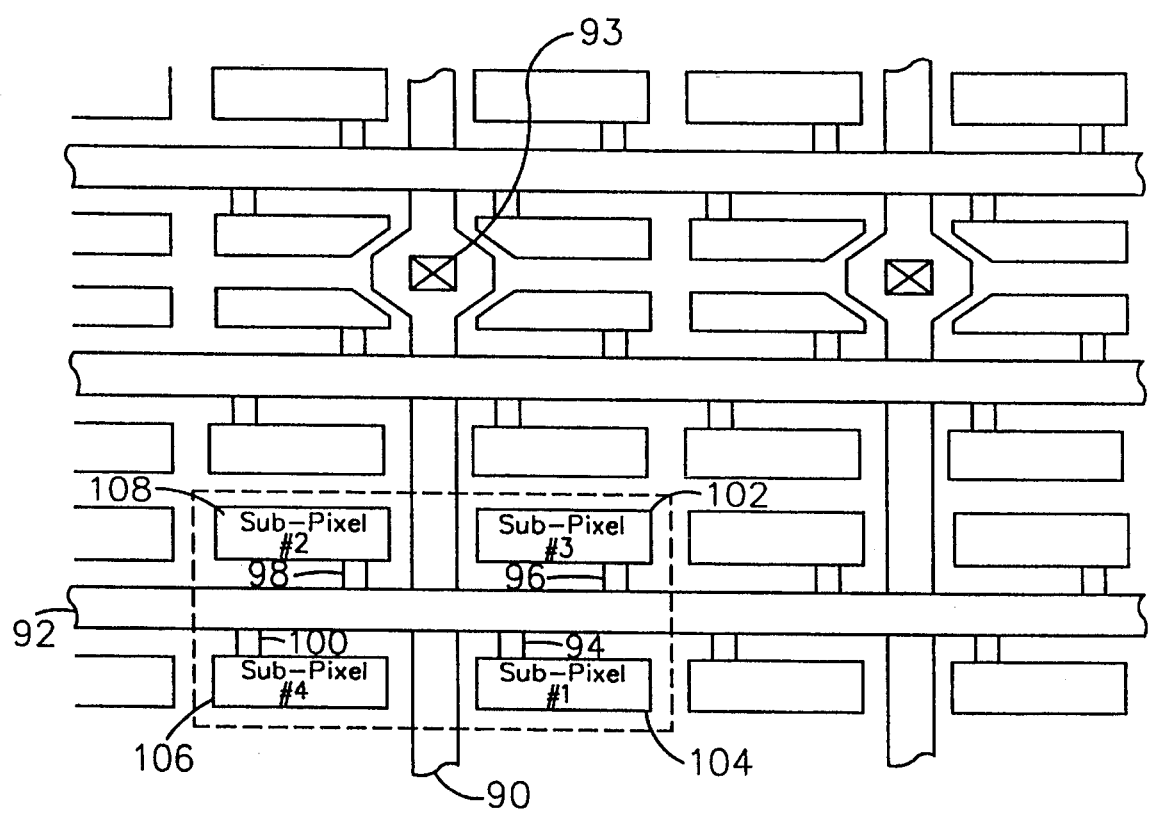
FIG. 10 is a top view of the shared source array in a half tone configuration.

In the fourth and final embodiment of the invention, the shared source contact architecture described in the third embodiment is combined with the half tone configuration described in the second embodiment. As shown in FIG. 10, each electrode is broken down into four subpixels 102, 104, 106 and 108. Each subelectrode is in contact with a drain 96, 94, 100 and 98, respectively. Along with source line 90 and gate line 92, the drain regions form a series of transistors for each subelectrode as was described in the second embodiment. Included in this configuration are shared contacts 93 which are evenly spaced between the gate lines, commonly in the order of 32. As was described above, this shared source contact approach reduces line resistance while minimizing the area devoted to contacts.

Figure 11:
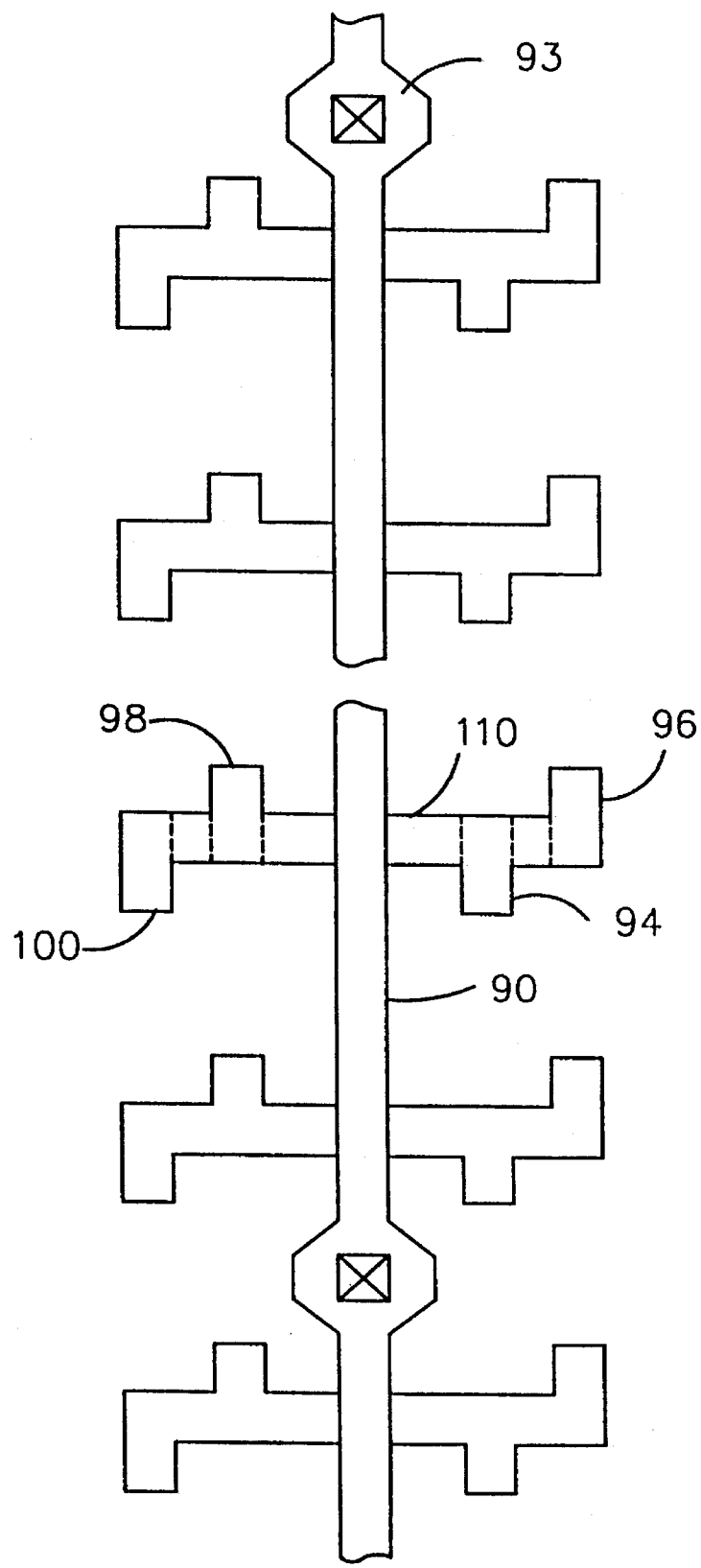
FIG. 11 is a top view of the source and drain regions in the single crystal silicon layer for the shared source halftone array.

FIG. 11 is a top view of the single crystal silicon layer 110 which has been masked and doped to form the various drain regions as well as a source bus. As can be seen, the electrical contacts 93 are spaced along the source bus. As with the third configuration, an aluminum strip runs from the driver over an insulating layer which has been deposited on the source bus and this contact allows transmission of the data signal from the driver to the individual subpixel transistors. This shared source half tone configuration achieves maximum pixel aperture ratio for a given photolithographic resolution while providing superior large display performance.

The foregoing is a description of a novel and nonobvious AMLCD architecture. The applicant does not intend to limit the invention to the foregoing description, but instead to define the invention through the claims appended hereto.

I claim:

1. An active matrix for a liquid crystal display comprising:

a substrate;

a plurality of parallel data source lines disposed on said substrate;

a plurality of drain means disposed proximate to said data source lines, wherein the plurality of data source lines and drain means are formed from a layer of single crystal silicon which has been etched and selectively doped;

a transparent insulating layer disposed over said data source lines, said substrate and a portion of said drain means;

a plurality of parallel gate lines disposed over the insulating layer so as to intersect said data source lines and said drain means to form a plurality of contactless thin film transistors (TFT's); and a plurality of transparent electrodes disposed over the insulating layer, each of the transparent electrodes in electrical contact with one of the plurality of drain means.

2. The active matrix for a liquid crystal display of claim 1 wherein each of the drain means is located proximate to an intersection of the gate line and the data source line.

3. The active matrix for a liquid crystal display of claim 1 wherein four of the drain means are located proximate to an intersection of the gate lines and the data source lines so as create four of the TFTs, each of the drain means is in electrical contact with one of the plurality of transparent electrodes so as to provide a half tone configuration for the liquid crystal display.

4. The active matrix for a liquid crystal display of claim 3 wherein a switching voltage for each of the TFT's is determined by adjusting width to length ratios of the TFT's.

5. The active matrix for a liquid crystal display of claim 1 wherein each of the data source lines runs parallel to a metallic conductor strip, electrical contacts are provided between the metallic conductor strips and the plurality of data source lines at predetermined intervals.

6. The active matrix for a liquid crystal display of claim 5 wherein four of the drain means are located proximate to an intersection of the gate lines and the data source lines so as create four of the TFTs, each of the drain means is in electrical contact with one of the plurality of transparent electrodes so as to provide a half tone configuration for the liquid crystal display.

7. The active matrix for a liquid crystal display of claim 6 wherein a switching voltage for each of the TFT's is determined by adjusting width to length ratios of the drains.

8. The active matrix for a liquid crystal display of claim 1 wherein the plurality gate lines are comprised of indium tin oxide (ITO).

9. The active matrix for a liquid crystal display of claim 1 wherein the plurality gate lines are comprised of polysilicon.

10. The active matrix for a liquid crystal display of claim 1 wherein the plurality gate lines are comprised of a refractory metal silicide.

11. An active matrix for a liquid crystal display comprising:

a transparent substrate;

a first layer disposed on said transparent substrate and formed into a plurality of parallel data source lines and drain regions for a plurality of thin film transistors (TFT), wherein the plurality of data source lines and drain means are formed from a layer of single crystal silicon which has been etched and selectively doped;

an oxide layer disposed over the data source lines, said transparent substrate and a portion of each of the drain regions of the first silicon layer;

a plurality of gate lines disposed over the oxide layer which intersects the source and drains so as to form plurality of TFT's; and a plurality of transparent electrodes laid out in an array, each of said transparent electrodes is in electrical contact with one of the plurality of drain regions.

12. The active matrix for a liquid crystal display of claim 11 wherein each of the drains is located proximate to an intersection of the gate lines and the data source lines.

13. The active matrix for a liquid crystal display of claim 11 wherein four of the drains are located proximate to an intersection of the gate lines and the data source lines so as create four of the TFTs, each of the drains is in electrical contact with one of the plurality of transparent electrodes so as to provide a half tone configuration for the liquid crystal display.

14. The active matrix for a liquid crystal display of claim 13 wherein a switching voltage for each of the TFT's is determined by adjusting width to length ratios of the TFT's.

15. The active matrix for a liquid crystal display of claim 11 wherein each of the data source lines runs parallel to a metallic conductor strip, electrical contacts are provided between the metallic conductor strips and the plurality of data source lines at predetermined intervals.

16. The active matrix for a liquid crystal display of claim 15 wherein four of the drains are located proximate to an intersection of the gate lines and the data source lines so as create four of the TFTs, each of the drains is in electrical contact with one of the plurality of transparent electrodes so as to provide a half tone configuration for the liquid crystal display.

17. The active matrix for a liquid crystal display of claim 16 wherein a switching voltage for each of the TFT's is determined by adjusting width to length ratios of the drains.

18. The active matrix for a liquid crystal display of claim 11 wherein the plurality gate lines are comprised of indium tin oxide (ITO).

19. The active matrix for a liquid crystal display of claim 11 wherein the plurality gate lines are comprised of polysilicon.

20. The active matrix for a liquid crystal display of claim 11 wherein the plurality gate lines are comprised of a refractory metal silicide.

* * * * *